US010050954B2

(12) United States Patent
Schultz et al.

(10) Patent No.: US 10,050,954 B2
(45) Date of Patent: Aug. 14, 2018

(54) SECURE AUTOMATED DEVICE CONFIGURATION AND MANAGEMENT (71) Applicant: Verizon Patent and Licensing Inc., Arlington, VA (US)

(72) Inventors: Paul T. Schultz, Colorado Springs, CO (US); Robert A. Sartini, Colorado Springs, CO (US); Tim D. Paiement, Colorado Springs, CO (US); Elliot G. Eichen, Arlington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 258 days.

(21) Appl. No.: 15/011,801

(22) Filed: Feb. 1, 2016

(65) Prior Publication Data

US 2017/0223011 A1 Aug. 3, 2017

(51) Int. Cl.
*G06F 7/04* (2006.01)
*H04L 29/06* (2006.01)

(52) U.S. Cl.
CPC .......... *H04L 63/0823* (2013.01); *H04L 63/06* (2013.01); *H04L 65/1006* (2013.01)

(58) Field of Classification Search
CPC .. H04L 63/0823; H04L 63/06; H04L 65/1006
USPC .......................................................... 726/7
See application file for complete search history.

(56) References Cited

U.S. PATENT DOCUMENTS

| 2008/0028458 | A1* | 1/2008 | Masuhiro | H04L 29/06027 726/14 |
| 2009/0089435 | A1* | 4/2009 | Terrill | H04L 65/1016 709/227 |
| 2010/0217837 | A1* | 8/2010 | Ansari | G06Q 30/04 709/218 |
| 2011/0060948 | A1* | 3/2011 | Beebe | H04L 43/0817 714/37 |
| 2013/0286861 | A1* | 10/2013 | Smith | H04L 12/6418 370/252 |
| 2016/0050229 | A1* | 2/2016 | Patel | H04L 63/1458 726/23 |

\* cited by examiner

Primary Examiner — Teshome Hailu (57) ABSTRACT

A method may include performing secure device configuration, via a configuration service manager device, for a SIP user device. The method includes monitoring, via the configuration service manager device, the SIP user device for device authentication problems, configuration file download problems, device registration problems and device third party registration problems. The method may also include detecting the device authentication problems, and logging and reporting the detected device authentication problems. The method may also include automated testing of the device and logging and reporting of detected device test problems. The method further includes resolving the detected device authentication, registration or testing problems.

20 Claims, 10 Drawing Sheets

SECURE AUTOMATED DEVICE CONFIGURATION AND MANAGEMENT

BACKGROUND

Service providers sell and distribute desk phones (e.g., Voice over Long Term Evolution (VoLTE) for Business, Session Initiation Protocol (SIP) multimedia desk phones, etc.) to customers (e.g., business customers). The service providers may provision and put phones into service. SIP phones may be deployed to a wide variety of customer locations with a wide variety of network configurations (e.g., including routers, network address translators (NATs), firewalls, session border controllers, application layer gateways, etc.).

DETAILED DESCRIPTION OF PREFERRED EMBODIMENTS

The following detailed description refers to the accompanying drawings. The same reference numbers in different drawings may identify the same or similar elements.

Systems and/or methods described herein may securely automate (i.e., perform secure automated) device configuration for SIP user devices. The systems may also perform monitoring, service management, troubleshooting and problem resolution for the SIP user devices. The systems may perform authenticating (e.g., via certificates) and auto-provisioning of SIP phones. Systems and/or methods described herein may allow user devices to be automatically provisioned and put into service in a secure and cost effective manner. The method may also include automated testing of the device and logging and reporting detected device test problems. The method further includes resolving the detected device authentication, registration or testing problems.

Consistent with embodiments, the systems may perform packet capture (PCAP) file generation and storage. The systems may provide device service management, troubleshooting, notification and problem resolution. The systems may extend voice over long term evolution (VoLTE) services and include auto-provisioning capability (that may include a configuration management proxy (CM Proxy)). SIP phones may be deployed to a wide variety of customer locations with a wide variety of network configurations (e.g., including routers, NATs, firewalls, session border controllers, application layer gateways, etc.).

Figure 1:
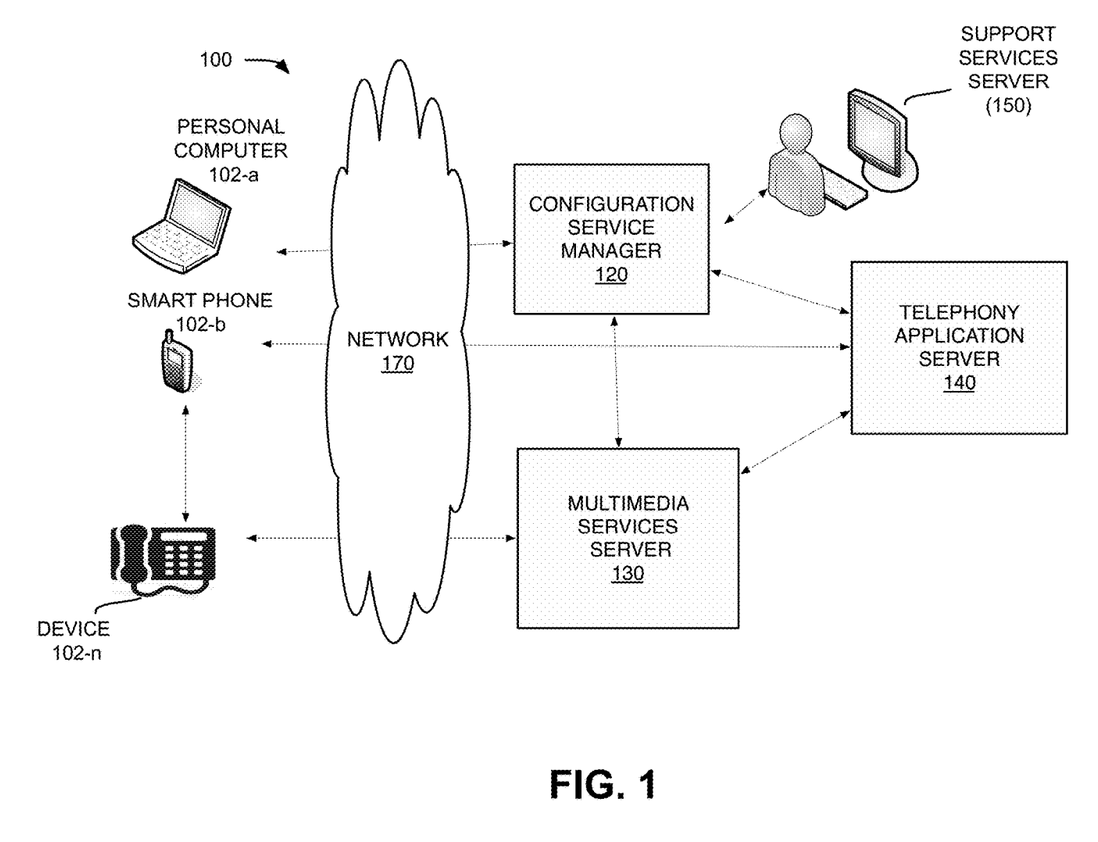
FIG. 1 is a diagram of an exemplary network in which systems and/or methods described herein may be implemented.

FIG. 1 is a diagram of an exemplary network 100 in which systems and/or methods described herein may be implemented. As illustrated, network 100 may include user devices 102 (individually, "user device 102-*x*") a configuration service manager server 120, a multimedia services server 130, a telephony application server 140, and support services server 150 coupled to a network 170. Components of network 100 may be interconnected via wired and/or wireless connections. The configuration of components of network 100 illustrated in FIG. 1 is for illustrative purposes only. Other configurations may be implemented. Therefore, network 100 may include additional, fewer and/or different components than those depicted in FIG. 1. Also, in some instances, one or more of the components of network 100 may perform one or more functions described as being performed by another one or more of the components of network 100.

Network 100 may comprise a SIP oriented network 100, such as: an all Internet Protocol (IP) network; an IP Multimedia Subsystem (IMS) network; and/or a Long Term Evolution (LTE) network with Voice over LTE. Network 100 may include SIP proxies, SIP soft-switches, and SIP gateways (not shown) that facilitate signaling in a SIP oriented network 100.

User devices 102 may include devices that use SIP communication, such as mobile telephones, personal digital assistants (PDAs), laptop computers, desktop computers, tablet computers, wearable computers, Internet-of-Things (IoT) devices, or another type of computation or communication device, as described herein below with respect to FIG. 3. SIP is a request/response protocol used for signaling in, for example, voice over IP networks. User devices 102 may connect to network 170 via wired, wireless, and/or optical connections. The devices in network 100 (including user devices 102) may communicate using a connection oriented protocol, such as transmission control protocol (TCP) and/or a connectionless communication protocol, such as user datagram protocol (UDP) or Internet protocol (IP).

The systems may provide secure automatic self-provisioning, service management and troubleshooting of user devices 102 (e.g., SIP multimedia desk phones) that may rely on heterogeneous third party networks. The systems may reduce the difficulty, time and expenses associated with managing user devices 102 for the service provider by providing the ability to remotely detect, troubleshoot and resolve problems, including third party network issues. The systems may use processes via configuration service manager server 120, multimedia services server 130, telephony application server 140 and user devices 102 to remotely detect, troubleshoot and resolve problems. The systems may reduce the necessity to deploy on site technicians and may increase the profitability of service provider services, e.g., services that include fixed/stationary devices (e.g., SIP multimedia desk phones).

Configuration service manager server 120 may be the central controller for trouble detection, reporting and resolution and may perform one or more of these operations, as described herein below with respect to FIG. 5. Configuration service manager server 120 may perform device and network fingerprinting, interaction logging, analysis and tagging. Configuration service manager server 120 may also perform processes to manage invalid device certificates, such as detection, logging, reporting and resolution of invalid device certificates. Configuration service manager server 120 may also perform processes to test, identify problems and resolve problems with user devices 102.

Multimedia services server 130 may deliver IP multimedia services (or form part of an architectural framework or platform for delivering multimedia services). Multimedia services server 130 may perform registration services as described herein below with respect to FIG. 6 and FIG. 10. For example, multimedia services server 130 may utilize IP multimedia subsystem (IMS) network elements including Call Session Control Function (CSCF) servers and Home Subscriber Server (HSS) to perform user device 102 registrations, as described herein below with respect to FIG. 10. Multimedia services server 130 may provide voice and/or video call services over a switched-circuit-style network and/or wireless network. Multimedia services server 130 may aid the access of multimedia and voice applications from wireless and wireline terminals, i.e., to create a form of fixed-mobile convergence (FMC). Multimedia services server 130 may include alternative and overlapping technologies for access and provisioning of services across wired and wireless networks include combinations of Generic Access Network, soft switches and "naked" SIP.

Telephony application server 140 may function as the telephony services registrar to which the device registers via third party registration from multimedia services server 130. In instances in which something goes wrong with registration, telephony application server 140 may perform one or more operations to mitigate, correct or otherwise process third party registration from multimedia services server 130, such as described with respect to FIG. 7 herein below. Telephony application server 140 may also carry out functions in telephone networks that are not directly related to the routing of messages through the network. Telephony application server 140 may carry out functions such as in-network answering machines, toll free 800 numbers, automatic call forwarding, conference bridges and other types of telephony services.

Support services server 150 may communicate with configuration service manager server 120 to resolve issues with device configuration management. Support services server 150 may provide access to support personnel to aid in processing configuration and registration of user devices 102.

Network 170 may include a LAN, a wide area network (WAN), a metropolitan area network (MAN), a telephone network, such as the Public Switched Telephone Network (PSTN), a cellular network, a Long Term Evolution (LTE) network, and LTE-Unlicensed network, an LTE-Broadcast network, a Wi-Fi network, an intranet, the Internet, an optical fiber (or fiber optic)-based network, or a combination of networks. Network 100 may include an IP telephony network based on the SIP protocol. Devices using networks 170 may be connected via wired (e.g., Ethernet, coaxial cable, etc.) or wireless connections (e.g., using network devices such as those available under the IEEE 802.11 wireless LAN standards).

Although FIG. 1 shows exemplary components of environment 100, in other implementations, environment 100 may contain fewer components, different components, differently arranged components, or additional components than depicted in FIG. 1.

Figure 2:
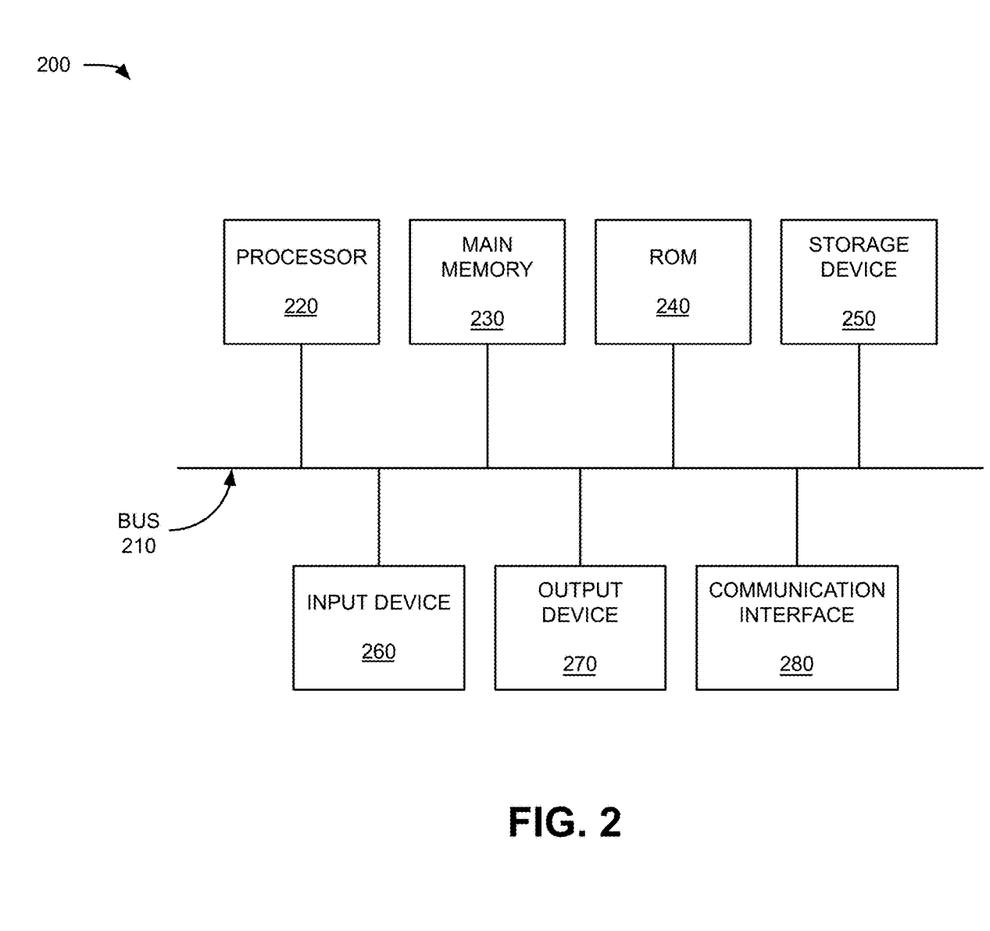
FIG. 2 is a diagram of exemplary components of one or more devices of the network depicted in FIG. 1.

FIG. 2 is a diagram of exemplary components of a device 200 that may correspond to one or more devices of network 100, such as user devices 102, configuration service manager server 120, multimedia services server 130, telephony application server 140, and support services server 150. As illustrated, device 200 may include a bus 210, a processor 220, a main memory 230, a read-only memory (ROM) 240, a storage device 250, an input device 260, an output device 270, and a communication interface 280. Bus 210 may include a path that permits communication among the components of device 200.

Processor 220 may include one or more processors, microprocessors, or other types of processing units that may interpret and execute instructions. Main memory 230 may include a random access memory (RAM) or another type of dynamic storage device that may store information and instructions for execution by processor 220. ROM 240 may include a ROM device or another type of static storage device that may store static information and/or instructions for use by processor 220. Storage device 250 may include a magnetic and/or optical recording medium and its corresponding drive.

Input device 260 may include a mechanism that permits an operator to input information to device 200, such as remote control, control buttons, a keyboard, a mouse, a pen, a microphone, voice recognition and/or biometric mechanisms, a touch screen, gesture recognition, etc. Output device 270 may include a mechanism that outputs information to the operator, including a display, an indicator light, a speaker, haptics, etc. Communication interface 280 may include any transceiver-like mechanism that enables device 200 to communicate with other devices and/or systems. For example, communication interface 280 may include mechanisms for communicating with another device or system via a network.

As described herein, device 200 may perform certain operations in response to processor 220 executing software instructions contained in a computer-readable medium, such as main memory 230. A computer-readable medium may be defined as a non-transitory memory device. A memory device may include space within a single physical memory device or spread across multiple physical memory devices. The software instructions may be read into main memory 230 from another computer-readable medium, such as storage device 250, or from another device via communication interface 280. The software instructions contained in main memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer components, different components, differently arranged components, or additional components than depicted in FIG. 2. In still other implementations, one or more components of device 200 may perform one or more other tasks described as being performed by one or more other components of device 200.

Figure 3:
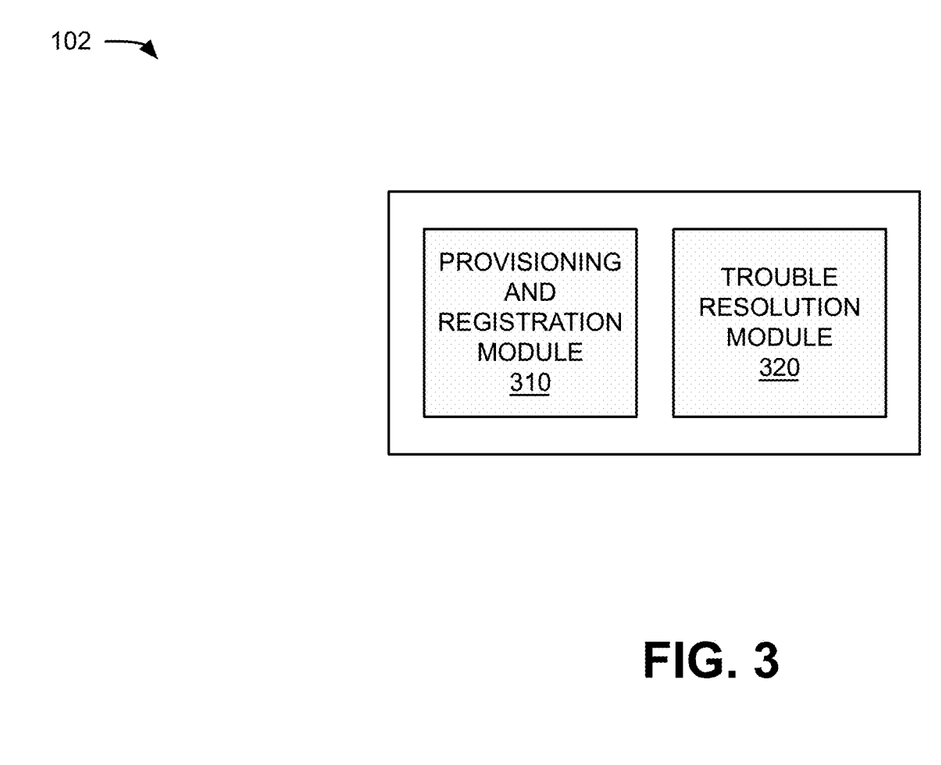
FIG. 3 is a functional block diagram of the SIP user device depicted in FIG. 1.

FIG. 3 is a functional block diagram of user device 102. In one implementation, the functions described in connection with FIG. 3 may be performed by one or more components of device 200 (FIG. 2). User device 102 may include a provisioning and registration module 310, and a signaling module 320.

User devices 102 may include a transceiver (not shown) to transmit and receive SIP messages. User devices 102 may implement SIP according to the Internet Engineering Task Force (IETF) document Request For Comments (RFC) 2543 and document RFC 3261. Additionally, user devices 102 may implement testing functionality, e.g., voice quality testing according to RFC 6035. In instances in which there are no configuration or provisioning issues, user devices 102 are designed to be connected (e.g., a user connects the user device 102 to a power source, Ethernet, etc.), and powered on, after which provisioning and registration module 310 is to auto-provision, register with the multimedia services server 130, and telephony application server 140. Upon registration via provisioning and registration module 310, the user device 102 is ready for operation. An exemplary SIP authentication, configuration and registration flow 400 is described with respect to FIG. 4 herein below.

In some instances, there may be issues with configuration or provisioning of user devices 102. Device trouble scenarios may include missing, invalid and/or expired certificates, poor Ethernet connection, firewall blocking, Network Address Translation (NAT) issues, device configuration download failure, bad device configuration, inability of device to register with multimedia services server 130, and/or telephony application server 140 for service, inability of device to place (or receive) audio/video calls, calls with half-duplex streaming (e.g., user can't see or hear other party), etc.

In instances in which there are configuration or provisioning issues, trouble resolution module 320 may perform one or more operations to facilitate monitoring, service management, troubleshooting and problem resolution. These operations include generating a packet capture (PCAP) file and/or generating diagnostic log files. Additionally, device 102 may include testing capabilities e.g., voice quality testing as specified by RFC 6035. Trouble resolution module 320 may transmit diagnostic information and PCAP files to configuration service manager server 120. If there is no network connectivity, trouble resolution module 320 may instruct user device 102 to pair with nearby device (e.g., smartphone, tablet, PC) and/or network (e.g., Wi-Fi, Bluetooth, LTE, etc.). Trouble resolution module 320 may then transmit files and/or diagnostic information, and generate and send trouble notification (e.g., to configuration service manager server 120). Trouble resolution module 320 may also provide user feedback to configuration and service manager 120, e.g., via device screen, via tethered device like smartphone, etc.

Figure 4:
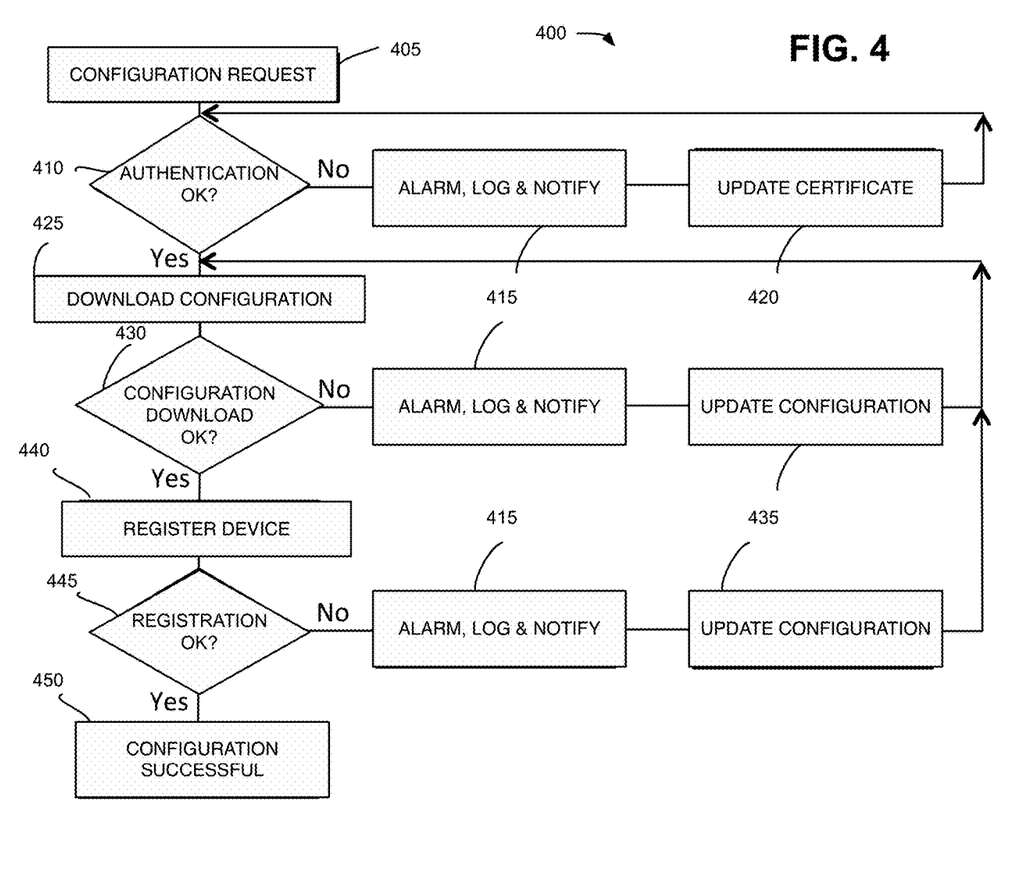
FIG. 4 is an exemplary SIP authentication, configuration and registration flow.

FIG. 4 is an exemplary SIP authentication, configuration and registration flow 400 for a user device 102 by configuration service manager server 120. As shown in FIG. 4, SIP authentication, configuration and registration flow 400 may include a primary flow for authenticating, configuring and registering user device 102 (i.e., a SIP phone) which results in the SIP phone having service.

As shown in FIG. 4, at block 405, configuration service manager server 120 may receive a configuration request from user device 102. Configuration service manager server 120 may attempt to authenticate user device 102 at block 410. If the authentication at block 410 is not successful (authentication ok=no), configuration service manager server 120 may receive an alarm, and user device 102 and/or configuration service manager server 120 may log the unsuccessful authentication and send notifications to relevant network components or devices at block 415 (e.g., configuration service manager server 120, support services 150, etc.). In response, configuration service manager server 120 may provide an updated certificate to user device 102 at block 420 and user device 102 and process 400 may return to block 410 for another authentication attempt.

If authentication at block 410 is successful, user device 102 may download configuration files and configure user device 102 at block 425. User device 102 may verify whether the configuration download is successful at block 430 and if the configuration download is unsuccessful, user device 102 and/or configuration service manager server 120 may alarm, log and notify as described at block 415 and then update the configuration at block 435. User device 102 may then determine whether the download configuration is successful at block 430 again.

If the downloaded configuration is ok, user device 102 may attempt to register at block 440. For example, referring to FIG. 1, multimedia services server 130 may utilize IMS network elements including CSCF servers and HSS (not shown in FIG. 4) to perform user device 102 registrations. If user device 102, multimedia services server 130, telephony application server 140, and/or the configuration service manager server 120 determines that registration is not ok, at block 445, user device 102, multimedia services server 130, telephony application server 140, and/or configuration service manager server 120 may alarm, log and notify as at block 415 and update configuration as at block 435. If user device 102, multimedia services server 130, telephony application server 140, and the configuration service manager server 120 determines that registration is ok, configuration service manager server 120 may confirm successful registration at block 450.

Following successful device configuration, automated device service testing may be initiated. In instances in which there are issues, the device may perform one or more of the operations described hereinabove with respect to FIG. 3.

Figure 5:
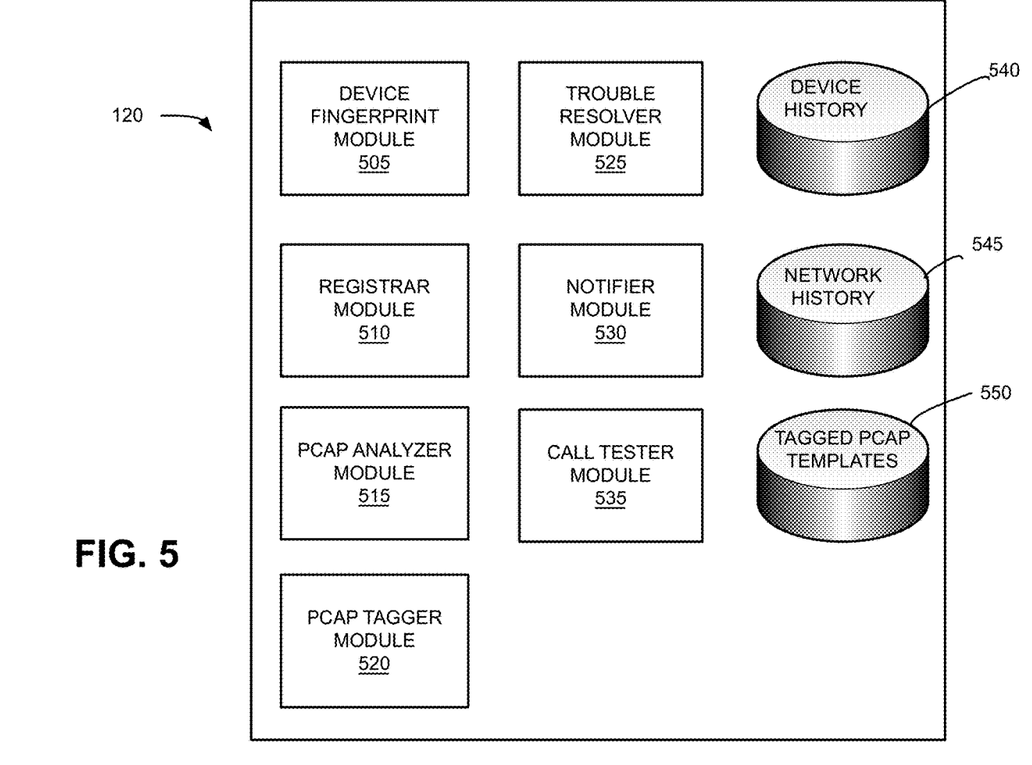
FIG. 5 is a functional block diagram of the configuration service manager server of FIG. 1.

FIG. 5 is a functional block diagram of the configuration service manager server 120 of FIG. 1. In one implementation, the functions described in connection with FIG. 5 may be performed by one or more components of device 200 (FIG. 2). As shown in FIG. 5, configuration service manager server 120 may include a device fingerprint module 505, a registrar module 510, a PCAP analyzer module 515, a PCAP tagger module 520, a trouble resolver module 525, a notifier module 530, and a call tester module 535. Configuration service manager server 120 may also include storage for device history 540, network history 545 and tagged PCAP templates 550.

Configuration service manager server 120 is the central controller for trouble detection, reporting and resolution associated with configuring and registering user devices 102 in network 100. Configuration service manager server 120 may perform one or more operations to ensure that authenticated user devices 102 are correctly registered and configured.

Device fingerprint module 505 may perform device and network fingerprinting, interaction logging, analysis and tagging based on device fingerprint information and network information. Device fingerprint information may include one or more of device information, e.g., MAC Address, Operating System, current screen size, user device time zone, browser plug-ins installed, language settings, system fonts, an indication of whether cookies are enabled, user device graphics capabilities (e.g., resolution, video memory), software versions, International Mobile Equipment Identifier (IMEI), Mobile Station International Subscriber Directory Number (MSISDN), International Mobile Subscriber Identity (IMSI), Mobile Equipment Identifier (MEID), Unique Device ID (UDID), etc. Network Information may include IP Address, Carrier/ISP Name, Location associated with IP Address, Network-derived Location (e.g., cell triangulation, A-GPS), Access Point Name (APN), Connection Type, Connection Speed, Autonomous System Number (ASN), etc.

Registrar module 510 may facilitate and/or monitor registration of user device 102. Registrar module 510 may communicate with user device 102, multimedia services server 130 and/or telephony application server 140 in instances in which registration is initiated by user device 102. Registrar module 510 may monitor and record registration of user device 102 based on device information associated with user device 102.

PCAP analyzer module 515 and PCAP tagger module 520 may perform PCAP and log file analysis, classification and tagging. PCAP analyzer module 515 may analyze PCAP files generated in association with user devices 102. PCAP tagger module 520 may tag the PCAP files. PCAP files may be generated from a user device 102 and/or other components of network 100. PCAP analyzer module 515 may analyze PCAP files and related information (e.g., device info., network info. e.g., from tools like: traceroute, netstat, Ipconfig, Nslookup, ping, etc.) from the user device 102. PCAP analyzer module 515 may classify the PCAP files (e.g., "successful-NAT'ed", "unsuccessful-Firewalled", etc.).

PCAP tagger module 520 may annotate/tag the PCAP files for troubleshooting, comparison and problem resolution. In instances in which a problem occurs, PCAP analyzer module 515 may analyze PCAP files and related files which it may generate for the problem scenario and then compare the PCAP files and related files with previously captured information in order to determine problem root causes and potential problem resolutions. Problem resolution may include automatically generating and downloading a new device configuration file based on previously stored problem classification and resolution templates.

Trouble resolver module 525 may resolve issues such as invalid device certificates, device configuration file provisioning error, device registration failure for multimedia services server 130 and/or telephony application server 140, etc. Trouble resolver module 525 may receive a request to re-provision the SIP user device 102 based on a problem with the SIP user device 102. Trouble resolver module 525 may select a most appropriate configuration based on the problem with the SIP user device 102 and resolve the problem with the SIP user device using the most appropriate configuration.

In instances of invalid device certificate, trouble resolver module 525 may detect, log, report (e.g., to support services 150) and resolve issues with the invalid device certificate (e.g., push valid certificate to device). In instances of device configuration file provisioning errors, trouble resolver module 525 may detect, log, report and resolve issues with the configuration file provisioning (e.g., push valid/"minimal"/test configuration file to device).

In instances of attempted registration with multimedia services server 130, trouble resolver module 525 may detect, log, report and resolve issues with device registration failure to multimedia services server 130. Trouble resolver module 525 may push updated valid/"minimal"/test configuration file to user device 102. In instances of attempted registration with telephony application server 140, trouble resolver module 525 may detect, log, report and resolve issues with device registration failure to telephony application server 140 (e.g., third party registration from multimedia services server 130 to telephony application server 140).

Notifier module 530 may provide notifications to appropriate remote support organizations based on particular issues. For example, notifier module 530 may provide a support team with appropriate trouble identification, device/network/configuration information and problem resolution recommendations via support services server 150. Notifier module 530 may provide notifications and information to support staff in the event that problem(s) gets automatically resolved, in case the customer still calls support.

Call tester module 535 may implement automated testing of device functionality as described herein below with respect to FIG. 8.

Configuration service manager server 120 may include storage for device history 540, network history 545 and tagged PCAP templates 550. The PCAP templates 550 may generated via PCAP and log file analysis. The PCAP templates 550 may be used to compare, troubleshoot and resolve problems with user devices 102. Configuration service manager server 120 may access these templates and information to identify changes, troubleshoot problems and resolve problems.

Figure 6:
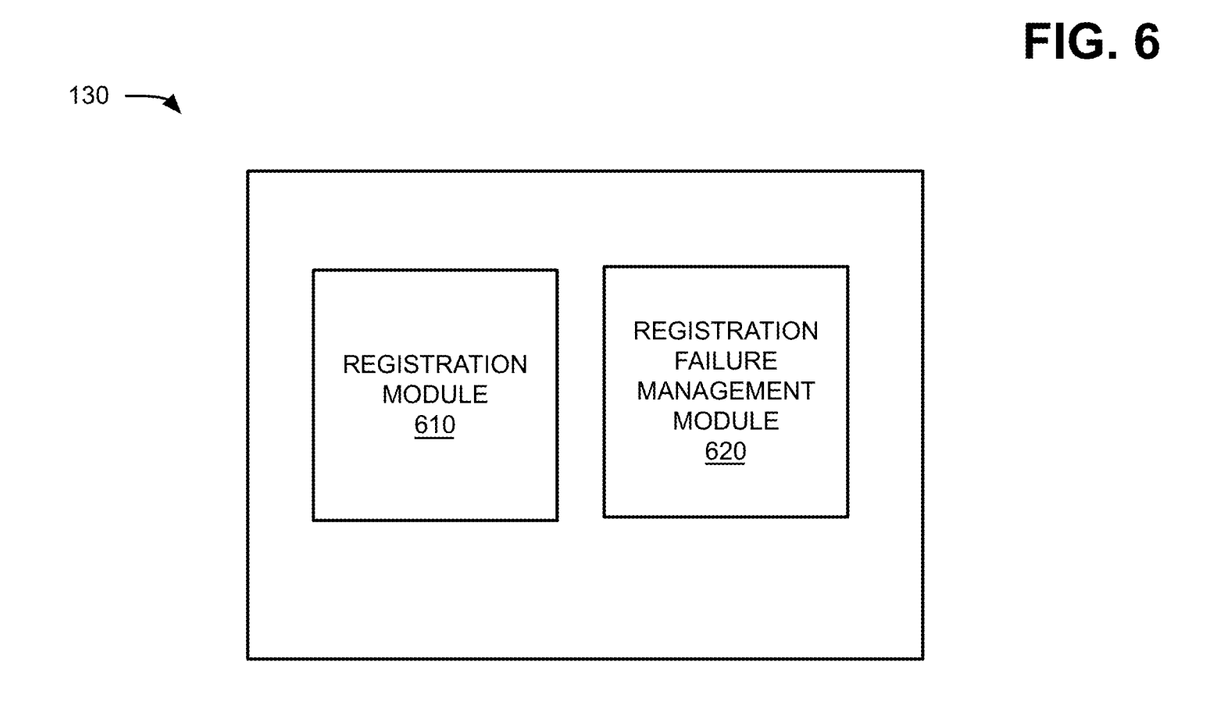
FIG. 6 is a functional block diagram of the multimedia services platform server of FIG. 1.

FIG. 6 is a functional block diagram of the multimedia services server 130 of FIG. 1. In one implementation, the functions described in connection with FIG. 6 may be performed by one or more components of device 200 (FIG. 2). As shown in FIG. 6, multimedia services server 130 may include a registration module 610 and a registration failure management module 620.

Multimedia services server 130 may implement trouble detection, reporting and resolution methods for registration associated with multimedia services server 130. Although particular functions of multimedia services server 130 are described with respect to registration and registration failure management it should be understood that multimedia services server 130 may perform additional functions associated with a multimedia services platform, such as an IMS network. For example, Multimedia services server 130 may utilize IMS network elements including CSCF servers and HSS to perform user device 102 registrations.

Registration module 610 may be an initial registrar to which the user device 102 registers. Registration module 610 may also perform third party registration to (one or more) application servers, including telephony application server 140. In instances in which issues arise with registration at multimedia services server 130, registration module 610 may request (or invoke) registration failure management module 620 to perform one or more operations in response to the registration failure of the user device 102.

In response to device registration failure (at multimedia services server 130), registration failure management module 620 may detect, log, report and resolve device registration (to multimedia services server 130) failure by performing appropriate functions based on the details of the registration failure (e.g., instruct configuration service manager server 120 to send configuration files (i.e., push updated valid/"minimal"/test configuration file) to user device 102).

In response to device third party registration failure (to telephony application server 140), registration failure management module 620 may detect, log, report and resolve device third party registration (e.g., third party registration from multimedia services server 130 to telephony application server 140) failure by performing appropriate functions based on the details of the registration failure (e.g., instruct configuration service manager server 120 to send configuration files (i.e., push updated valid/"minimal"/test configuration file) to user device 102).

Figure 7:
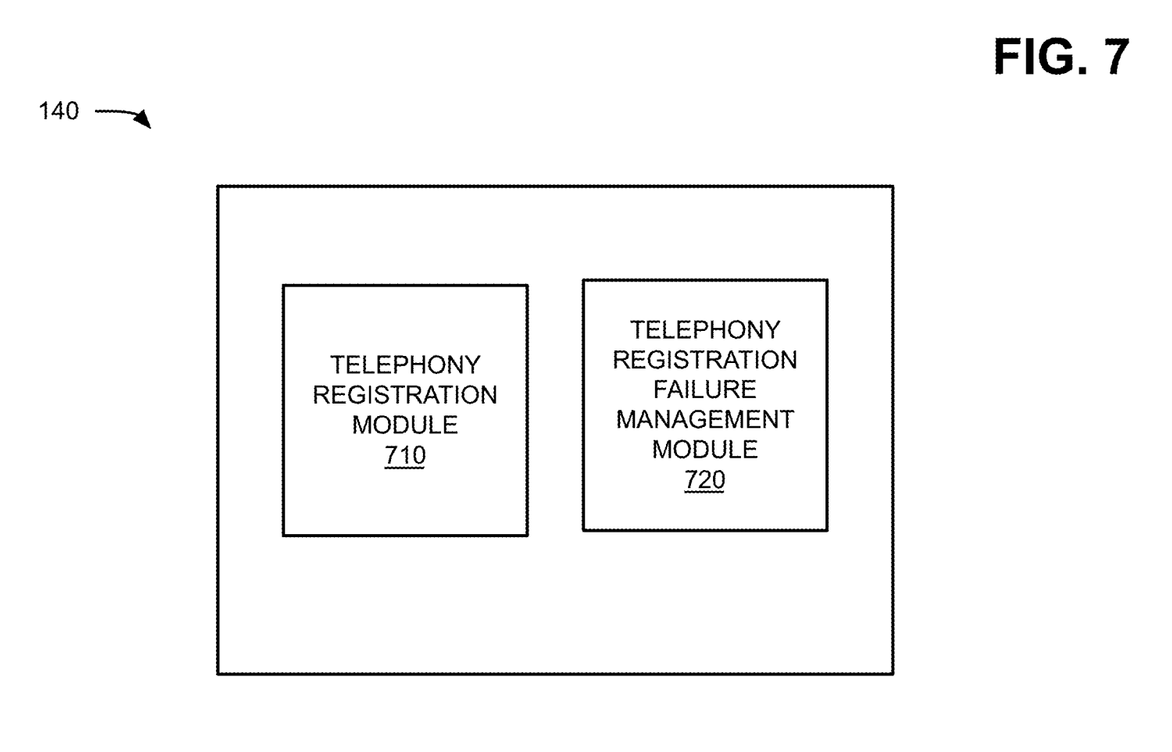
FIG. 7 is a functional block diagram of the telephony application server of FIG. 1.

FIG. 7 of the telephony application server 140 of FIG. 1. In one implementation, the functions described in connection with FIG. 7 may be performed by one or more components of device 200 (FIG. 2). As shown in FIG. 7, telephony application server 140 may include a telephony registration module 710 and a telephony registration failure management module 720.

Telephony application server 140 may implement trouble detection, reporting and resolution methods for registration associated with telephony application server 140. Although particular functions of telephony application server 140 are described with respect to registration and registration failure management it should be understood that telephony application server 140 may perform additional functions associated with telephony applications, such as functions in a telephone network that are not directly related to the routing of messages through the network.

Telephony registration module 710 may be the telephony services registrar to which the user device 102 registers via third party registration from the multimedia services server 130. In instances in which issues arise with registration in association with telephony application server 140, telephony registration module 710 may request (or invoke) telephony registration failure management module 720 to perform one or more operations in response to the registration failure of the user device 102.

In response to third party registration failure (from multimedia services server 130): telephony registration failure management module 720 may detect, log, report and resolve device third party registration (to telephony application server 140) failure by performing appropriate functions based on the details of the registration failure (e.g., instruct configuration service manager server 120 to send configuration files (i.e., push updated valid/"minimal"/test configuration file) to user device 102).

In response to registration notification failure (to configuration service manager server 120), telephony registration failure management module 720 may detect, log, report and resolve registration notification failure (e.g., instruct configuration service manager server 120 to push updated valid/"minimal"/test configuration file to user device 102).

Figure 8:
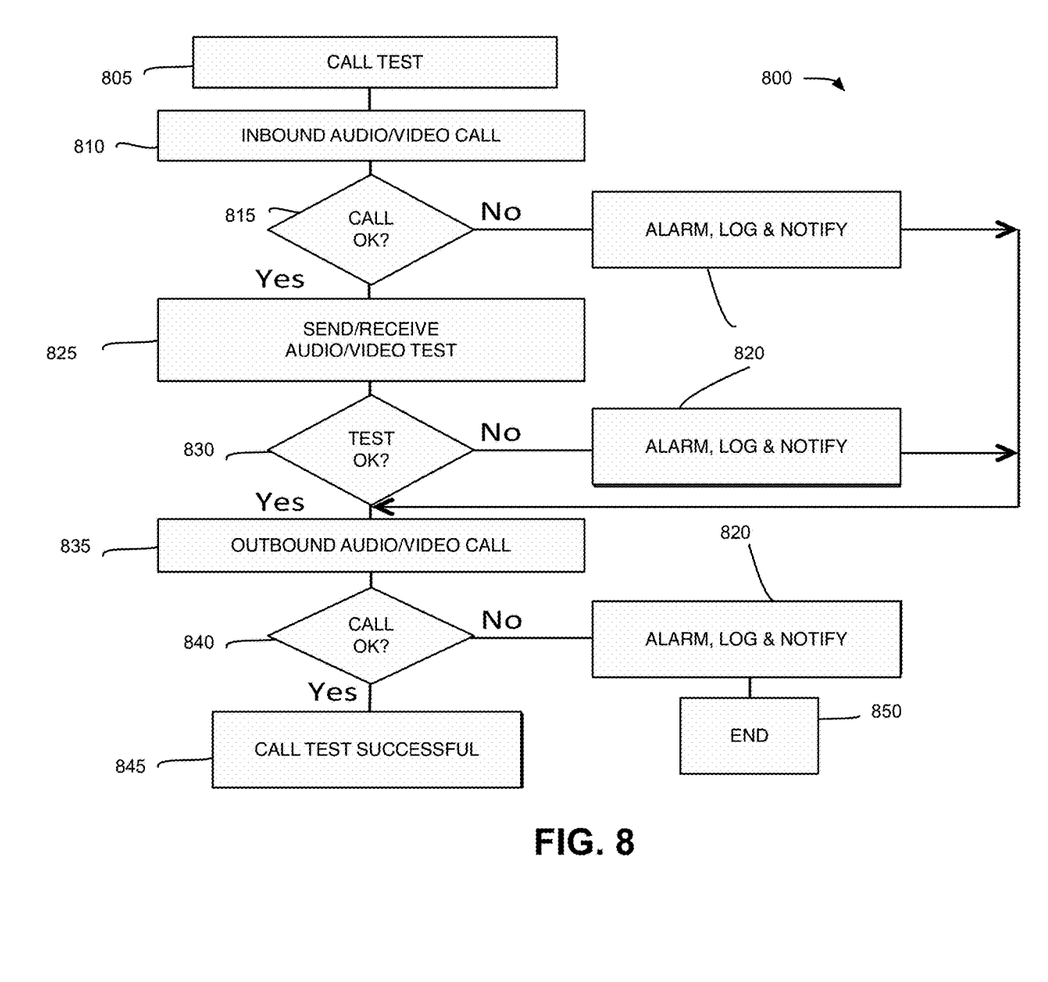
FIG. 8 is an exemplary auto service test flow according to an implementation described herein.

FIG. 8 is a flow chart of another exemplary auto service test flow process 800 according to implementations described herein. In one implementation, process 800 may be performed by configuration service manager server 120. In another implementation, some or all of process 800 may be performed by another device or group of devices, including or excluding configuration service manager server 120.

As shown in FIG. 8, at block 805, (e.g., upon successful device configuration and registration) a call test or other automated testing of device functionality may be initiated by configuration service manager server 120 (or alternatively from user device 102). The configuration service manager server 120 may send an automated inbound audio or video call at block 810. Configuration service manager server 120 may verify if the call is successful at block 815. If the call is not successful (call ok=no), configuration service manager server 120 (or user device 102 based on instructions received from configuration service manager server 120) may alarm, log, and notify that the call was unsuccessful at block 820. If the call is successful (call ok=yes), configuration service manager server 120 may initiate a test to send or receive audio or video at block 825.

At block 830, configuration service manager server 120 may determine if the test is ok. If the test is not ok, configuration service manager server 120 may alarm, log, and notify as at block 820. If the test is ok, at block 835, configuration service manager server 120 may initiate an outbound audio or video call from user device 102 (or user device 102 may send based on instructions from configuration service manager server 120 or other component of network 100). At block 840, configuration service manager server 120 may determine if the call is ok. If the call is not ok, configuration service manager server 120 may alarm, log, and notify as at block 820 and end the test at block 850. If the call is ok, at block 845, configuration service manager server 120 may report that the call test is successful.

If call test problems are detected, configuration service manager server 120 may invoke automated troubleshooting and problem resolution processes, such as described above with respect to FIG. 5.

Figure 9:
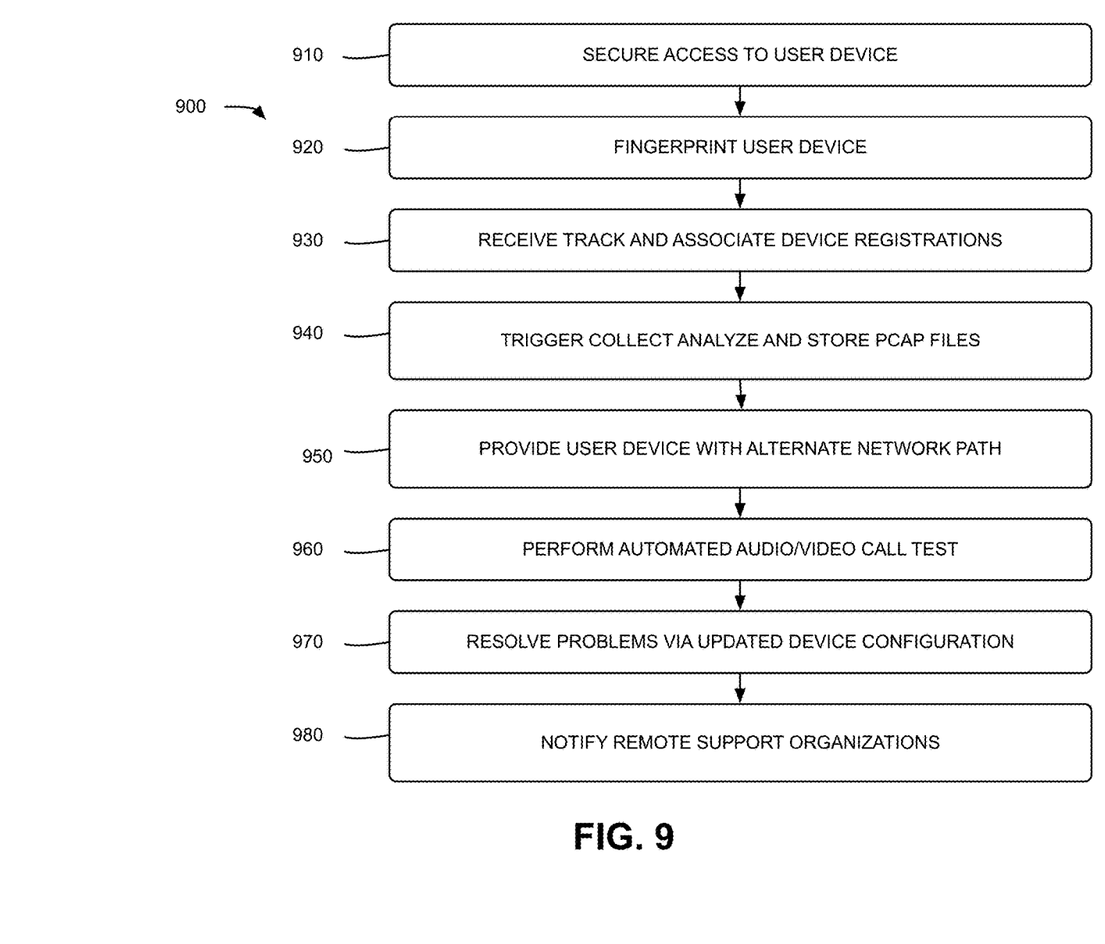
FIG. 9 is a flow chart of an exemplary process for providing device configuration management and trouble shooting according to implementations described herein.

FIG. 9 is a flow chart of an exemplary process flow 900 for providing device configuration management and troubleshooting according to implementations described herein. In one implementation, process 900 may be performed by configuration service manager server 120. In another implementation, some or all of process 900 may be performed by another device or group of devices, including or excluding configuration service manager server 120.

As illustrated in FIG. 9, process 900 may include securing of device access, configuration and management using a public key and private key management infrastructure (block 910). For example, configuration service manager server 120 may secure device access, configure and manage user devices 102 using X.509 certificates.

As further shown in FIG. 9, process 900 may include fingerprinting user devices 102 to provide device and network information for device configuration, management, troubleshooting and problem resolution (block 920). For example, configuration service manager server 120 may fingerprint user devices 102 as described hereinabove with respect to FIG. 5.

At block 930, configuration service manager server 120 may receive, track and associate device registrations (e.g., via third party registration and/or registration notification) following device configuration updates. For example, configuration service manager server 120 may receive information from IMS network elements including CSCF servers and HSS pertaining to user device 102 registrations.

Configuration service manager server 120 may trigger, collect, analyze and store device, network, configuration and packet capture (PCAP) files at block 940. Configuration service manager server 120 may also classify, tag and create templates for "good" and "bad" PCAP files for use in device/service troubleshooting and problem resolution.

At block 950, configuration service manager server 120 may provide device with alternate network path (e.g., via smartphone, tablet, PC, etc.) when problems are detected using user device's 120 primary network (e.g., Ethernet).

At block 960, configuration service manager server 120 may perform automated audio/video inbound/outbound call test (or instruct another device to perform automated audio/video inbound/outbound call test, e.g., telephony application server 140), such as described with respect to FIG. 8 hereinabove. Configuration service manager server 120 may test audio/video by sending and receiving the audio/video. Configuration service manager server 120 may automatically detect, log, report/notify and resolve device calling and/or call termination problems. Configuration service manager server 120 may initiate automated device service testing of functions associated with SIP communication by user device 102, capture test results, and notify support of any detected problems and initiated automatic problem resolution.

Configuration service manager server 120 may, at block 970, resolve problems via updated device configuration, updated network configuration, customer network recommendations, etc. Configuration service manager server 120 may solve problems automatically, when possible, and provide support staff with helpful troubleshooting and problem resolution information when needed.

At block 980, configuration service manager server 120 may proactively notify appropriate remote support organizations in the event a problem is detected. Configuration service manager server 120 may provide support teams with appropriate trouble identification, device/network/configuration information and problem resolution recommendations. In the event that problem(s) gets automatically resolved, configuration service manager server 120 may still provide information to support staff (i.e., support services 150) in case customer still calls support.

Figure 10:
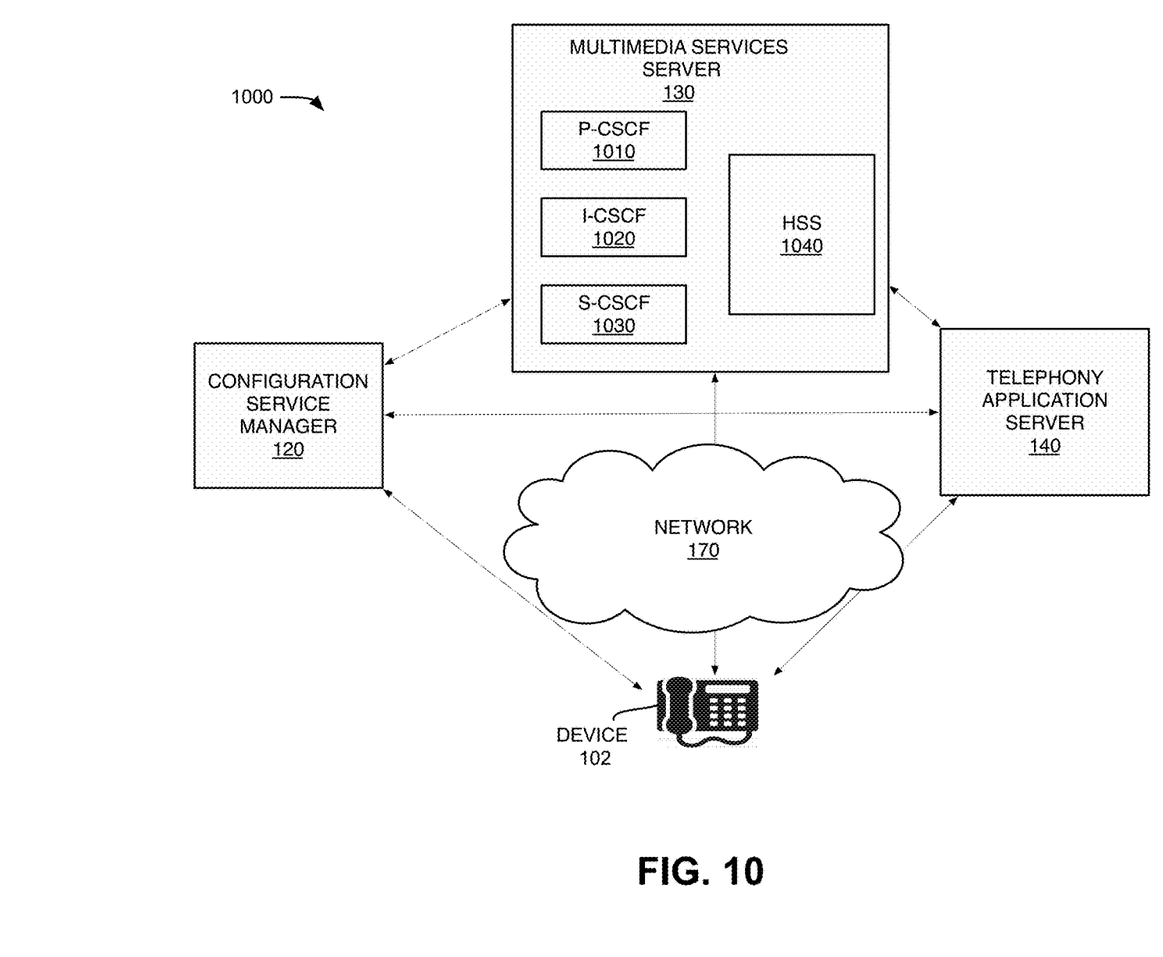
FIG. 10 is a diagram of an exemplary network in which systems and/or methods described herein may be implemented.

FIG. 10 is a diagram of an exemplary network 1000 in which systems and/or methods described herein may be implemented. As illustrated, network 1000 may include user device 102, configuration service manager server 120, multimedia services server 130, and telephony application server 140 coupled to network 170. Multimedia services server 130 may include P-CSCF 1010, I-CSCF 1020, S-CSCF 1030 and HSS 1040. Components of network 1000 may be interconnected via wired and/or wireless connections. The configuration of components of network 1000 illustrated in FIG. 10 is for illustrative purposes only. Other configurations may be implemented. Therefore, network 1000 may include additional, fewer and/or different components than those depicted in FIG. 10. Also, in some instances, one or more of the components of network 1000 may perform one or more functions described as being performed by another one or more of the components of network 1000.

As shown in FIG. 10, user device 102 may utilize network 170 to provide the user of user device 102 communications services, e.g., voice, video, messaging, authentication, location-based services, etc. Network 170 may be a user's network or her corporation's network and may include routers, NATs, firewalls, session border controllers, application layer gateways, etc. that cause problems delivering services to users of user device 102.

Service activation of user device 102 may include user device 102 authenticating to configuration service manager 120 and downloading configuration for device 120. Device 102 may then register with multimedia services server 130. For example, multimedia services server 130 may utilize IMS network elements including CSCF servers (P-CSCF 1010, I-CSCF 1020, and S-CSCF 1030) and HSS 1040 to perform user device 102 registrations. CSCF servers may include proxy, interrogating and serving CSCFs (P-CSCF 1010, I-CSCF 1020 and S-CSCF 1030). Additionally, IMS registration may utilize HSS 1040 services including an HSS subscriber database that may contain subscriber identifiers, device identifiers, subscriber service profiles, service triggers, and other information.

Following successful registration of user device 102 with multimedia services server 130, multimedia services server 130 may send third party registration to telephony application server 140. Problems may occur with user device 102 communicating with configuration service manager 120, multimedia services server 130, and/or telephony application server 140 via network 170. These problems may adversely effect services provided to the user of user device 102.

In instances in which problems are detected, configuration service manager 120 may attempt to correct the detected problems by sending (i.e., "pushing") updated configuration files to user device 102. Configuration changes to user device 102 may include configuring different ports and/or port ranges (e.g., for signaling and/or media packet transport), configuring different protocols (e.g., TCP instead of UDP, media over transport layer security (TLS), SIP over TLS, etc.) and/or changing other user device 102 network, service, authentication and/or security information including timers, service uniform resource identifiers (URIs), gateway URIs, proxy URIs, domain name system (DNS) network addresses, NAT settings, account settings, feature settings and/or troubleshooting configuration parameters. Additionally, or alternatively, configuration service manager 120 may push new firmware to user device 102.

Configuration service manager 120 may communicate with HSS 1040 to resolve the registration problems for user device 102. For example, configuration service manager 120 may resolve IMS registration problems via information from HSS 1040 including information from HSS subscriber databases, such as subscriber identifiers, device identifiers, subscriber service profiles, service triggers, etc.

Systems and/or methods described herein may securely automate device configuration, monitoring, service management, troubleshooting and problem resolution for user devices. The systems and/or methods may be implemented for SIP phones via a configuration service manager and other devices in an SIP network.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIGS. 4, 8 and 9, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A computer implemented method, comprising:
   performing secure device configuration, via a configuration service manager device, for a session initiation protocol (SIP) user device;
   detecting that the SIP user device lacks connectivity to a SIP network via a primary network path;

providing, to the SIP user device, an alternate network path for connectivity to the SIP network, wherein the alternate network path includes a user device associated with the SIP user device;
monitoring, via the alternate network path by the configuration service manager device, the SIP user device for device authentication problems, configuration file download problems, device registration problems and device third party registration problems;
detecting, based on the monitoring, the device authentication problems;
logging and reporting the detected device authentication problems;
performing automated testing of the device and logging and reporting detected test problems; and
resolving the detected device authentication problems.

2. The computer implemented method of claim 1, wherein detecting the device authentication problems further comprises:
detecting the device authentication problems via at least one public key private management certificate associated with the SIP user device.

3. The computer implemented method of claim 1, further comprising:
detecting, based on the monitoring, the configuration file download problems;
logging and reporting the configuration file download problems; and
resolving the configuration file download problems.

4. The computer implemented method of claim 1, further comprising:
detecting, based on the monitoring, the device registration problems;
logging and reporting the device registration problems; and
resolving the device registration problems.

5. The computer implemented method of claim 1, further comprising:
detecting the device third party registration problems;
logging and reporting the device third party registration problems; and
resolving the device third party registration problems.

6. The computer implemented method of claim 1, further comprising
fingerprinting the SIP user device;
analyzing the SIP user device based on the fingerprinting; and
logging and tagging the SIP user device and associated network information based on the analyzing.

7. The computer implemented method of claim 1, further comprising:
detecting problems with registrations with an associated multimedia services server;
logging and reporting the detected problems with the registrations with the associated multimedia services server; and
resolving the problems with the registrations with the associated multimedia services server.

8. The computer implemented method of claim 1, further comprising:
detecting problems with third party registrations with an associated telephony application server;
logging and reporting the detected problems with the registrations with the associated telephony application server; and
resolving the problems with the registrations with the telephony application server.

9. The computer implemented method of claim 1, further comprising:
receiving, via the alternate network path, packet capture (PCAP) files and diagnostic log files;
performing PCAP file and diagnostic log file analyses;
performing, based on the analyses, PCAP file and diagnostic log file classification and tagging to generate PCAP template files; and
resolving the test problems via the PCAP template files.

10. The computer implemented method of claim 1, further comprising:
receiving a request to re-provision the SIP user device based on a problem with the SIP user device;
selecting a most appropriate configuration based on the problem with the SIP user device; and
resolving the problem with the SIP user device using the most appropriate configuration.

11. The computer implemented method of claim 1, further comprising:
initiating automated device service testing;
capturing test results; and
notifying support of any detected problems and initiated automatic problem resolution.

12. A device, comprising:
a communication interface;
a memory to store a plurality of instructions; and
a processor configured to execute instructions in the memory to:
perform secure device configuration for a session initiation protocol (SIP) user device;
detect that the SIP user device lacks connectivity to a SIP network via a primary network path;
provide, to the SIP user device via the communication interface, an alternate network path for connectivity to the SIP network, wherein the alternate network path includes a user device associated with the SIP user device;
monitor, via the alternate network path, the SIP user device for device authentication problems, configuration file download problems, device registration problems and device third party registration problems;
detect, based on the monitoring, the device authentication problems;
log and report the detected device authentication problems; and
resolve the detected device authentication problems.

13. The device of claim 12, wherein, when detecting the device authentication problems, the processor is further to:
detect the device authentication problems via at least one public key private management certificate associated with the SIP user device.

14. The device of claim 12, wherein the processor is further to:
detect, based on the monitoring, the configuration file download problems;
log and report the configuration file download problems; and
resolve the configuration file download problems.

15. The device of claim 12, wherein the processor is further to:
detect, based on the monitoring, the device registration problems;
log and report the device registration problems; and
resolve the device registration problems.

16. The device of claim 12, wherein the processor is further to:

detect the device third party registration problems;
log and report the device third party registration problems; and
resolve the device third party registration problems.

17. The device of claim 12, wherein the processor is further to:
fingerprint the SIP user device;
analyze the SIP user device based on the fingerprinting; and
log and tag the SIP user device and associated network information based on the analyzing.

18. The device of claim 12, wherein the processor is further to:
detect problems with registrations with an associated multimedia services server;
log and report the detected problems with the registrations with the associated multimedia services server; and
resolve the problems with the registrations with the associated multimedia services server.

19. A non-transitory computer-readable storage medium including instructions to be executed by a processor, the instructions including one or more instructions, when executed by the processor, for causing the processor to:
perform secure device configuration, via a configuration service manager device, for a session initiation protocol (SIP) user device;
detect that the SIP user device lacks connectivity to a SIP network via a primary network path;
provide, to the SIP user device, an alternate network path for connectivity to the SIP network, wherein the alternate network path includes a user device associated with the SIP user device;
monitor, via the alternate network path by the configuration service manager device, the SIP user device for device authentication problems in a SIP network, configuration file download problems, device registration problems and device third party registration problems;
detect, based on the monitoring, the device authentication problems;
log and report the detected device authentication problems; and
resolve the detected device authentication problems.

20. The non-transitory computer-readable storage medium of claim 19, wherein, when detecting the device authentication problems, the one or more instructions further includes instructions to:
detect the device authentication problems via at least one public key private management certificate associated with the SIP user device.

* * * * *